United States Patent [19]
Stauffer et al.

[11] Patent Number: 5,906,411
[45] Date of Patent: May 25, 1999

[54] COMBINE HARVESTER CAB LAYOUT FOR VISIBILITY, SERVICEABILITY AND SPACE

[75] Inventors: David B. Stauffer, New Holland, Pa.; Russell W. Strong, Craftsbury Common, Vt.

[73] Assignee: New Holland North America, Inc., New Holland, Pa.

[21] Appl. No.: 08/880,120

[22] Filed: Jun. 20, 1997

[51] Int. Cl.[6] .................................................. B62D 33/06
[52] U.S. Cl. .............................. 296/190.11; 296/190.09; 296/190.1; 296/96.12; 49/40
[58] Field of Search .......................... 296/190.01, 190.8, 296/190.9, 190.1, 190.11, 37.15, 37.16, 96.12, 146.2; 49/40, 41, 502, 501

[56] References Cited

U.S. PATENT DOCUMENTS

| | | | |
|---|---|---|---|
| 2,563,845 | 8/1951 | Johnson | 49/40 |
| 2,667,379 | 1/1954 | Baze | 296/190.1 |
| 2,834,633 | 5/1958 | Ashton | 296/190.1 |
| 2,878,054 | 3/1959 | Linder | 296/146.8 |
| 2,934,374 | 4/1960 | Mortenson et al. | 296/37.16 |
| 3,841,430 | 10/1974 | Babbitt, Jr. | 296/190.09 |
| 4,050,733 | 9/1977 | Borrill | 180/89.12 |
| 4,088,364 | 5/1978 | Termont | 180/89.12 |
| 4,120,527 | 10/1978 | Lawrence | 296/190.09 |
| 4,416,486 | 11/1983 | McNaught et al. | . |
| 4,440,437 | 4/1984 | Hahm et al. | . |
| 4,580,831 | 4/1986 | Umeda | 296/146.8 |
| 4,605,259 | 8/1986 | Hurlburt | . |
| 4,652,043 | 3/1987 | Hurlburt | 296/190.11 |
| 4,772,065 | 9/1988 | Nakata et al. | 264/279 |
| 5,520,259 | 5/1996 | Onohara et al. | 180/89.12 |
| 5,538,472 | 7/1996 | Panoushek et al. | 460/119 |
| 5,685,591 | 11/1997 | Simplicean et al. | 296/37.16 |

FOREIGN PATENT DOCUMENTS

| | | | |
|---|---|---|---|
| 1956090 | 5/1971 | Germany | 296/37.15 |
| 2830660 | 2/1979 | Germany | 296/190.1 |
| 2750407 | 5/1979 | Germany | 49/501 |
| 1768432 | 10/1992 | U.S.S.R. | 296/190.09 |

OTHER PUBLICATIONS

Sales Brochure for the Maximizer Combines, Published 1996 by John Deere, Inc.

*Primary Examiner*—Dennis H. Pedder
*Attorney, Agent, or Firm*—J. William Stader; Larry W. Miller

[57] ABSTRACT

The disclosure relates to a cab on a combine harvester. The cab has a lower panel with four posts perpendicularly attached. An upper panel is supported by the posts. A windshield with a first compound curved glass is attached to the front. A left door and right door are pivotally affixed to the left front post and right front post respectively. Each door consists of a self-supporting compound curved glass. A rear panel has an upper rear panel, lower rear panel and a horizontal deck. The horizontal deck has two storage boxes.

14 Claims, 5 Drawing Sheets

COMBINE HARVESTER CAB LAYOUT FOR VISIBILITY, SERVICEABILITY AND SPACE

BACKGROUND OF INVENTION

1. Field of Art

This invention relates to the improvement of an agricultural combine harvester. More specifically it relates to an improvement of the cab of a combine harvester.

2. Description of Prior Art

Mechanical harvesting of grain has taken place for decades. However, efforts continue in the attempt to make harvesting operations more efficient and effective. A combine harvester generally includes a head which cuts the crop. The head then moves the cut crop into a feeder house. The feeder house lifts the cut crop into the threshing and separation areas of the combine. The grain is separated from the stalk by a rotor or threshing system. The grain is then moved and stored in a grain tank. The chaff and trash are deposited from the rear of the combine. An operator usually runs these various operations from a glass-enclosed cab. Typically, a cab is located behind the head and in front of the threshing and separation areas of the combine. An operator can observe most of the combine activities from the cab. During harvesting periods it is not uncommon for the combine to be operated for an extended time. Sometimes a single operator will use a combine for 16 to 18 hours a day. Furthermore, several operators may alternate in the use of the combine. Therefore is it necessary to provide a cab which will allow maximum operator comfort and flexibility. This will permit the operator to remain mentally alert for the long time intervals needed to harvest crops. Aspects of maintaining the operator's alertness includes providing a combine cab which is environmentally controlled, spacious and isolated from noise.

The effort to design and manufacture a better combine cab is considerable and has taken several approaches. In the early days of combine harvesting, there were no cabs and the operator was exposed to the outside elements during farming operations. During combine operations, a considerable amount of particulates are released in the air. Furthermore, the noise created by engine, header and threshing system is quite loud. Current cab design focuses on having a heating, ventilation and air conditioning system to maintain a comfortable working environment inside the cab. Current cab design also focuses on maintaining a good view of the header. Both of these focuses have resulted in several shortcomings. Usually the heating, ventilation and air conditioning unit is positioned either under the driver's chair or in the cab ceiling. When the unit is positioned under the driver's chair, dust or dirt can easily enter the return air system degrading or possibly damaging the unit. Also by positioning the unit beneath the seat, the distribution ducts are inserted in the roof posts. This necessitates the post circumference be increased to allow for air passage. This results in a greater obstruction to viewing the farming operations. When the unit is located in the ceiling of the cab, the condensation can drip into the headliner of the cab or onto the operator or control equipment. Periodically it may be necessary to remove the cab to perform work on the threshing system. Also it is frequently necessary to clean the heater and evaporator cores. This is difficult to accomplish in a roof or floor-mounted system. Also, because the engine coolant and refrigerant lines are moved, the ethylene glycol and the refrigerant contained within those lines is usually vented. Because of environmental concerns this adds considerable expense.

Currently, most cabs are constructed from a flat glass which requires a frame to prevent the glass from warping. The use of glass surfaces which are parallel to each other can also create a standing noise wave within the cab. The John Deere 'Maximer' combine harvester cab uses framed flat glass for the doors and a curved windshield. A standing noise wave can develop between the doors.

The prior art illustrates these and additional difficulties. U.S. Pat. No. 4,088,364 discloses an environmental control system and cab combination. This design places the air conditioner unit beneath the operator's chair. The return air intake 116 is located in close proximity to the cab floor. The fresh air is forced through the cab posts from an opening near the ceiling. As mentioned previously, dirt and dust on the operator's shoes would be drawn into the return air filter. The size of the cab post needs to be increased to accommodate the fresh air. The larger posts inhibit the operator from viewing the header or grain tank unloading auger (as seen from the rear of the cab). The placement of the air conditioning unit beneath the operator's chair also limits the space within the cab.

U.S. Pat. No. 4,605,259 discloses an operator's cab for a crop harvesting machine. The left door and right doors are parallel to each other resulting in the potential creation of a resonant sound wave.

U.S. Pat. No. 4,772,065 discloses a tractor cabin and manufacturing method therefor. Again the parallel wall and door surfaces can create a standing noise wave, resulting in discomfort for the operator.

U.S. Pat. No. 4,440,437 discloses an operator enclosure for a self-propelled harvester. A pair of mountings 44 allows the cab to tilted forward and access to be obtained to the threshing system beneath. Unfortunately, in order to allow the cab to tilt, its size is must be limited. To minimize the standing wave effect, the rear wall of the cab is affixed to the grain tank and a sound absorbing material is used. This increases the complexity of the cab. Generally, the use of a flat glass for doors includes a frame to support the glass. Without a frame, the glass warp which detrimentally impacts the seal between the remaining cab frame and door.

U.S. Pat. No. 4,416,486 discloses a vehicle cab for a combine. This disclosure reveals several parallel surfaces which create standing waves. Again, the flat glass door required a frame for support.

U.S. Pat. No. 5,538,472 discloses an agricultural vehicle cab temperature control system. Again, a portion of the cooling system is located beneath the driver's chair. When the cab is removed the heat exchanger lines must be separated and coolant and refrigerant is released. By moving the HVAC unit from the cab, there are several remote controls between the cab and HVAC unit. The cables to between the interior of the cab to the cab exterior creates a 'noise conduit' which allows the noise to travel into the cab.

Consequently, the need exists for a cab of a combine harvester such that the operator has an unobstructed view of farming operations, which is spacious, has a well-designed environment system and allows for easy access to the threshing systems.

OBJECTS OF THE INVENTION

It is an object of the present invention to provide an optimized combine harvester cab.

It is a further object of the present invention to provide an optimized combine harvester cab which has doors constructed from a non-parallel compound curved glass so as to not require a supporting frame, and provide improved acoustical qualities.

It is a further object of the present invention to provide an optimized combine harvester cab with increased space behind the operator's chair.

It is a further object of the present invention to provide an optimized combine harvester cab with a HVAC unit affixed to the exterior of the cab.

It is a further object of the present invention to provide an optimized combine harvester cab with a return air filter affixed to the interior of the cab above the floor so as to limit performance reducing particulates from entering the heating, ventilation and air conditioning unit.

It is a further object of the present invention to provide an optimized combine harvester cab which can be quickly and easily detached from the combine by removing four bolts, 3 wire harness plugs 2 brakes hoses and the cores of the heating, ventilation and air conditioning unit thus preventing the loss of refrigerant.

It is a further object of the present invention to provide an optimized combine harvester cab which has a deck with two storage boxes.

It is a further object of the present invention to provide an optimized combine harvester cab where the heating, ventilation and air conditioning unit is located near one of the storage boxes for cold storage utility.

It is a further object of the present invention to provide an optimized combine harvester cab which has a pair of front support posts which are smaller in circumference than the rear posts allowing for a less obstructed view of the header.

It is a further object of the present invention to provide an optimized combine harvester cab where the distribution ducting for the heating, ventilation and air conditioning unit is located on the exterior of the cab.

It is a further object of the present invention to provide an optimized combine harvester cab where the fresh air filter for the heating, ventilation and air conditioning unit is located on the exterior of the cab.

SUMMARY OF THE INVENTION

The invention overcomes the deficiencies of the prior art. The invention is an optimized combine harvester cab layout for visibility, serviceability and space. The cab has a lower panel with four posts supporting an upper panel. There is a front windshield with a compound curved glass surface. Pivotally affixed to the posts is a left door and right door. Each door has a self-supporting compound curved glass surface. The pinnacle of the curve glass surface is located at a height between the elbow and shoulder of the operator. Generally parallel to the front windshield is the rear panel. The rear panel has an upper rear panel and lower rear panel. Between the upper rear panel and lower rear panel is a horizontal deck containing a first and second storage box. Attached to the exterior of lower rear panel is the HVAC unit. The unit receives air from through the fresh air filter and return air filter. The fresh air filter is located on the exterior of the lower rear panel. The return air filter is located on the interior of the lower rear panel above the lower panel. The processed air moves from the HVAC unit to the interior of cab in distribution ducts positioned behind the trim lines of the cab. The cab can be removed from the combine by removing four bolts, unplugging three wire harness plugs, disconnecting two brake hoses and removing the cores of the HVAC unit.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
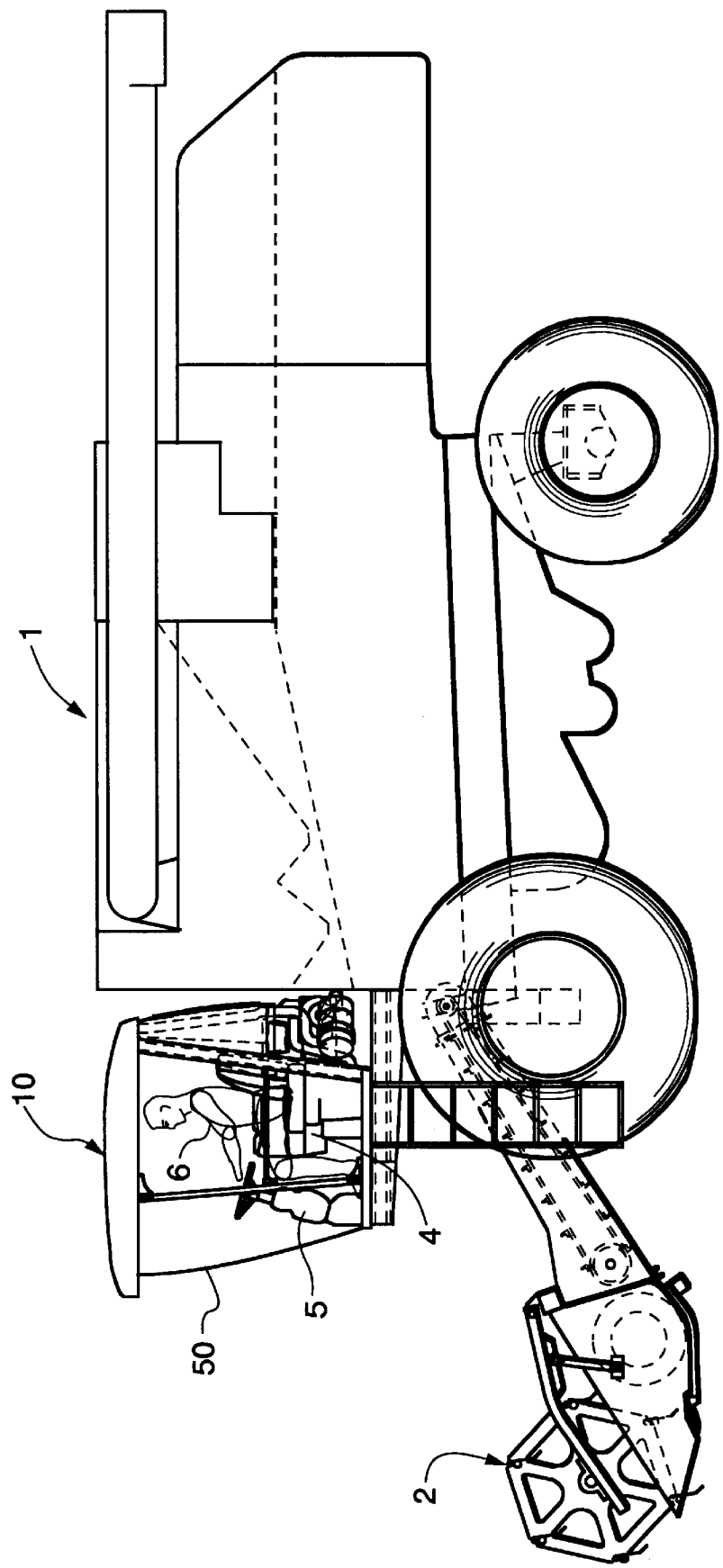
FIG. 1 is a side elevational view of a combine.
Figure 2:
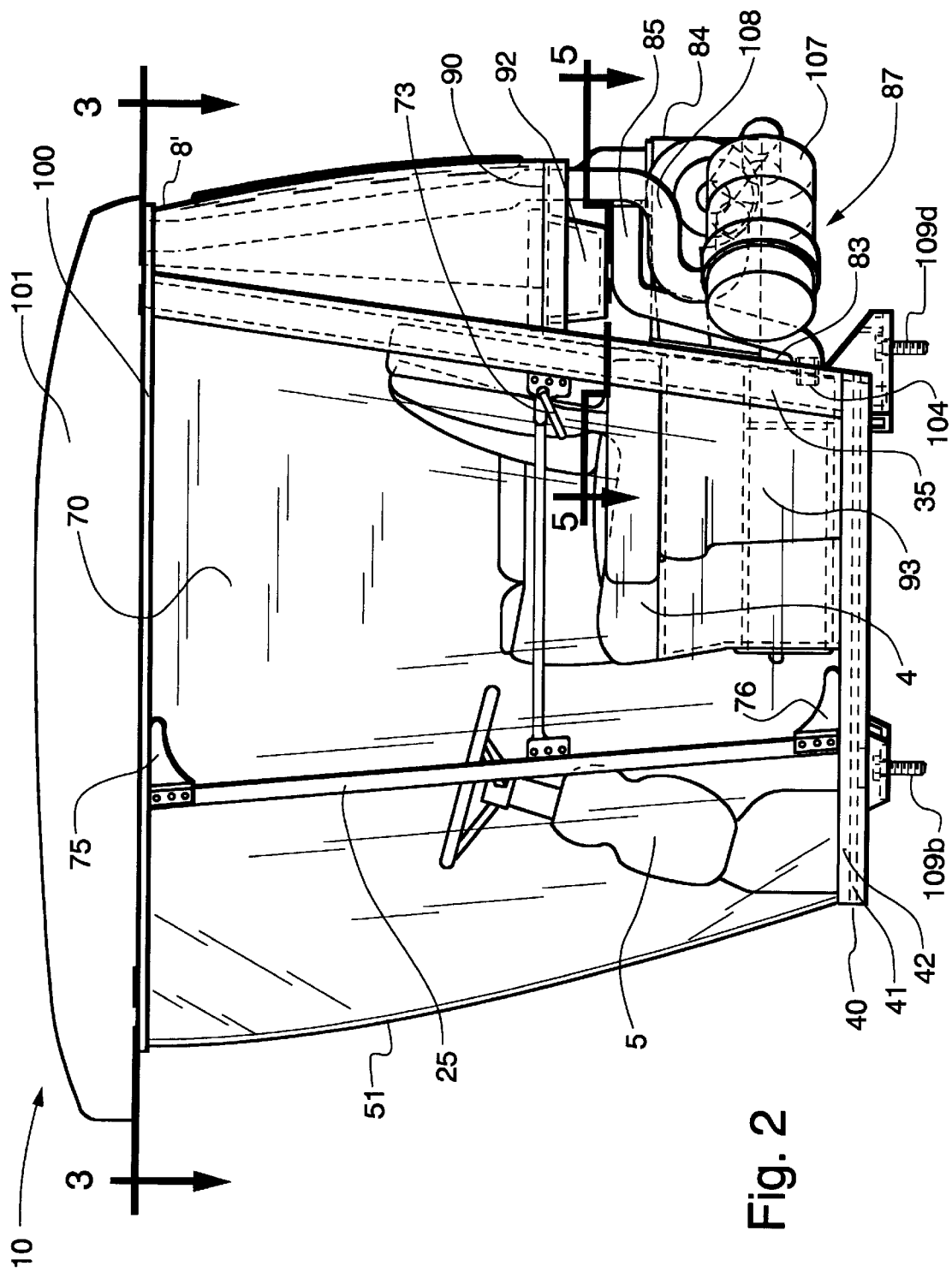
FIG. 2 is an enlarged side elevation of the combine cab.
Figure 3:
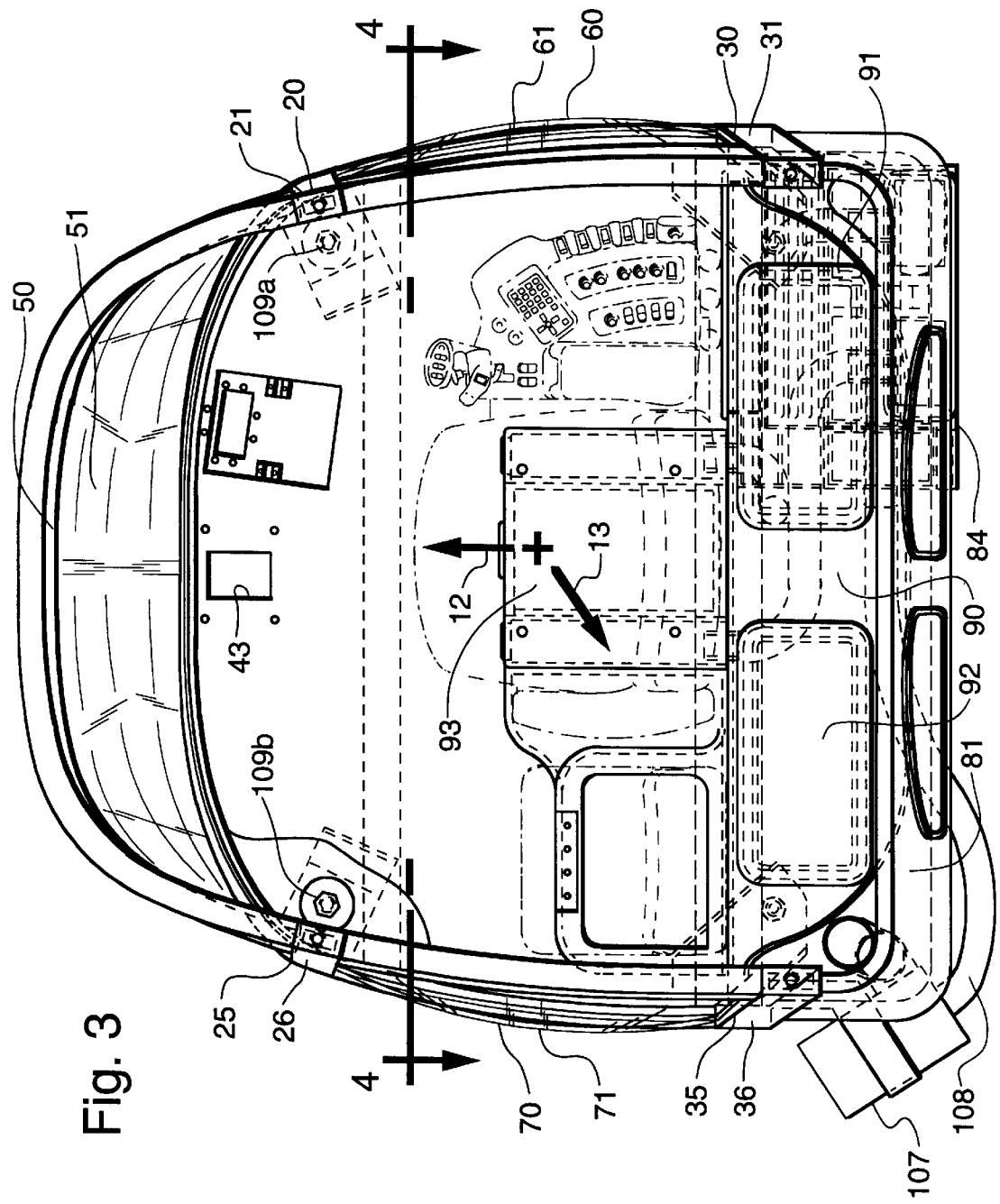
FIG. 3 is a horizontal sectional view of the cab taken on the line 3—3 of FIG. 2 with the steering column and pedals omitted and the seats and control console location indicated by phantom lines.
Figure 4:
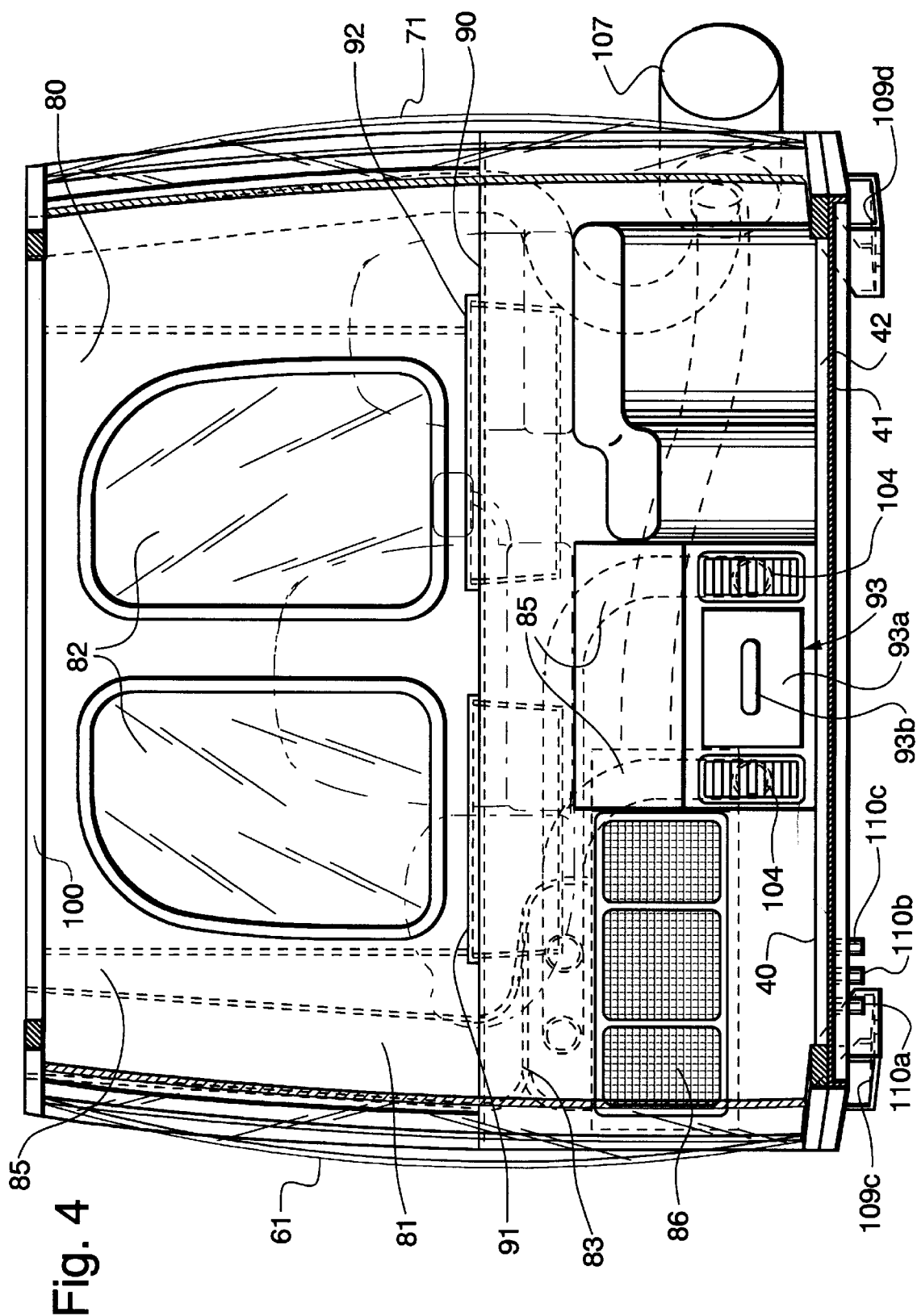
FIG. 4 is a vertical sectional view of the cab taken on the line 4—4 of FIG. 3.

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. Upward or downward orientations are relative to the ground or operating surface. Horizontal or vertical planes are also relative to ground.

A typical combine 1 has a header 2 for cutting a crop. As the combine 1 and header 2 are moved forward, the grain and stalk are cut by the header. The header moves the grain into an auger trough. A transverse auger pushes the grain and stalk in the auger trough to the center of the header. Located at the center of the header is the feeder house or elevator. The feeder house moves the grain and stalks rearward into the threshing and separation systems of the combine. After processing and separation, the processed grain is stored in a grain tank located near the top of the combine. The trash or chaff is ejected from the rear of the combine. The operator 6 runs the combine 1 from the cab 10 located behind the header 2 and at the front of the combine. From the cab the operator can observe most the various combine functions. The cab usually has a large glass window 50 or several windows which afford the operator the maximum ability to monitor the header 2. Located in the center of the cab is the steering column 5. Behind the steering column 5 is an operator's chair 4.

The present invention 10 is a cab located on a combine harvester 1. A general review of the major elements will be followed by a more detailed description later. The present invention is a cab 10 from which an operator 6 controls the fanning operations of a combine harvester. The cab 10 has an operator's chair 4 located behind the steering column 5. The present invention consists of a lower panel 40 with four posts 20, 25, 30 and 35 perpendicularly attached. An upper panel 100 is supported by the four posts 20, 25, 30 and 35. A windshield 50 with a first compound curved glass 51 is attached to the front posts 20 and 25. A left door 70 and right door 60 are pivotally affixed to the left front post 25 and right front post 20, respectively. A rear panel 80 has an upper rear panel 81, lower rear panel 83 and a horizontal deck 90 extending between the upper and lower rear panels 81, 83. The heating, ventilation and air conditioning (HVAC) unit 84 is attached to the exterior 87 of the lower rear panel 83. Air is brought to the HVAC unit 84 through a return air filter 86 and a fresh air filter 107. The processed air is returned to the interior 88 of the cab 10 by distribution ducting 85.

The lower panel 40 is the bottom of the combine cab 10. The lower panel 40 has a curved rectangular shape. The lower panel 40 has a steering mount 43 for the steering column 5. The steering mount 43 is a large rectangular opening surrounded by four bolt holes. The steering column motor (not shown) is inserted into the steering mount 43. The steering column 5 is affixed to the steering motor and is partially supported by the four bolt holes. A noise-reducing mat 42 may cover the lower panel 40. The mat 42 helps to limit the noise from the combine engine, head and threshing system. Affixed to the lower panel 40 is the operator's chair 4. The operator's chair 4 has a driver's seat storage area 93.

The driver's seat storage area 93 consists of a drawer 93a with a pull handle 93b.

There are four posts which are generally perpendicularly affixed to the lower panel 40. The right front post 20 and left front post 25 are attached towards the front of the lower panel 40. The right front post 20 has a right post circumference 21 and the left front post 25 has a left front post circumference 26. The right rear post 30 and left rear post 35 are attached at the rear of the lower panel 40. The right rear post 30 has a right rear post circumference 31 and the left rear post 35 has a left rear post circumference 36. Because the posts are not used to distribute air throughout the cab, they are considerable smaller in circumference than current art posts. Furthermore, in the present invention, the front posts 20 and 25 have smaller circumferences 21 and 26 than the rear posts' circumferences 31 and 36. The front posts each have a general circumference of 9.5 inches and the rear posts each have a general circumference of 13.5 inches. The smaller front post geometry helps to provide the operator 6 with a less obstructed view of the header 2 of the combine. The reduced geometry of the rear posts, while larger than the front post but smaller than current art rear posts, helps the operator observe the rear of the combine. This feature is especially valuable for rearward viewing 13 of the unloading auger when grain is being removed from the grain tank.

The upper panel 100 is perpendicularly supported by the front and rear posts 20, 25, 30 and 35. The upper panel 100 has a roof 101. The upper panel 100 has a ceiling vent (not shown) for projecting conditioned air downwards into the cab 10. The upper panel 100 is generally parallel to the lower panel 40 and is approximately the same shape of the lower panel 40.

The front windshield 50 is located at the front end of the cab. The windshield 50 has a first compound curved glass 51. This glass 51 has two curvatures. There is a vertical curve and a horizontal curve in the windshield 50. The windshield 50 is attached to the upper panel 100, the lower panel 40, the front right post 20 and front left post 25.

Pivotally affixed to the front posts 20 and 25 is the quadrilaterally shaped left door 70 and quadrilaterally shaped right door 60, respectively. The four sided nature of each door provides an easier means by which to enter and depart the cab. This in opposed to a more triangularly shaped door which is typically smaller at the base. This creates a smaller door threshold to enter or depart the cab through. The left door 70 consists of a second compound curved glass 71. Similar to the first compound curved glass 51 on the front windshield 50, the second compound curved glass 61 has two curves. One curve is horizontal and the other curve is vertical. Similarly, the right door 60 has a third compound curved glass 61. The use of compound curved glass in the left and right doors offers several advantages. Compound curved glass will minimize sound dispersion and prevent the creation of a standing noise wave. The use of flat glass in the doors may have resulted in the creation of a standing noise wave between the doors. The use of compound curved glass in the doors eliminates the expense of a frame which is often used in flat glass. Flat glass bends and, over time will not maintain an effective seal when closed. To overcome this problem a frame and an extensive rubber seal needs to be used. A compound curved glass door will bend less, and consequently will not require a frame or extensive seal. Finally, the positioning of the second compound curved glass 71 and third compound curved glass 61 so that convex of each curve is oriented towards the exterior of the cab creates a larger cab interior at a height that the operator is most conscious.

The left door 70 and right door 60 are pivotally affixed to the left front post 25 and the right front post 20, respectively by a pair of hinges. There is a first left hinge 75 and a second left hinge 76 attaching the left door 70 to the left front post 25. Likewise there is a first right hinge and a second right hinge (not shown) attaching the right door 60 to the right front post 20. The left door 70 may be pulled against the left rear post 35, the lower panel 40 and upper panel 100. Likewise, the right door 60 may be pulled against the right rear post 30, the lower panel 40 and upper panel 100. The left door 70 also has a left angled door handle 73. The handle 73 is designed to be oriented at a 15 degree angle on the exterior of the door. This allows for a more ergonomic position for the driver to reach and manipulate the handle when the door is operated.

Generally parallel to the front windshield 50 and affixed to the upper panel 100, lower panel 40, the rear right post 30 and rear left post 25 is the rear panel 80. The rear panel 80 consists of an upper rear panel 81 and lower rear panel 83. At a height between the shoulder and elbow of the seated operator is a horizontal deck 90. The deck 90 has a first storage box 91 and a second storage box 92 (both shown in phantom lines). The storage boxes have the capacity to accommodate several two liter soda bottles. The upper rear panel 81 also has a rear grain tank window or windows 82. The bottom of the upper rear panel 81 has been moved rearward creating an offset or horizontal deck 90. The off-set between the upper rear panel 81 and lower rear panel 83, besides creating the horizontal deck 90 provides the operator with the illusion of greater room in the interior of the cab. It also allows the operator to recline the seat back of the operator's chair at a greater variety of angles when rearwardly positioned in the cab.

The heating, ventilation and air conditioning (HVAC) unit 84 is positioned on the exterior 87 of the lower rear panel 83 beneath the first storage box 91. The HVAC unit receives fresh air from through the fresh air filter 107. The fresh air filter 107 is positioned on the exterior 87 of the lower rear panel 83. A duct 108 brings the fresh air to the HVAC unit 84. The HVAC unit 84 also receives air through the return air filter 86. The return air filter 86 is positioned on the interior 88 of the lower rear panel 83. The return air filter 86 is located 6 inches above the lower panel 40. By positioning the return air filter 86 above the floor, the amount of dust and other particulates entering the return air filter 86 is greatly reduced. Previously, return air filters have been located beneath the operator's chair. Particulates are more easily sucked into the return filter which is positioned close to the floor. The processed air (either heated air or cooled air) is distributed into the cab from the HVAC unit 84 by several distribution ducts 85 on the exterior of the cab trim lines. Each distribution duct is connected to a ceiling vent or a driver's vent.

Figure 5:
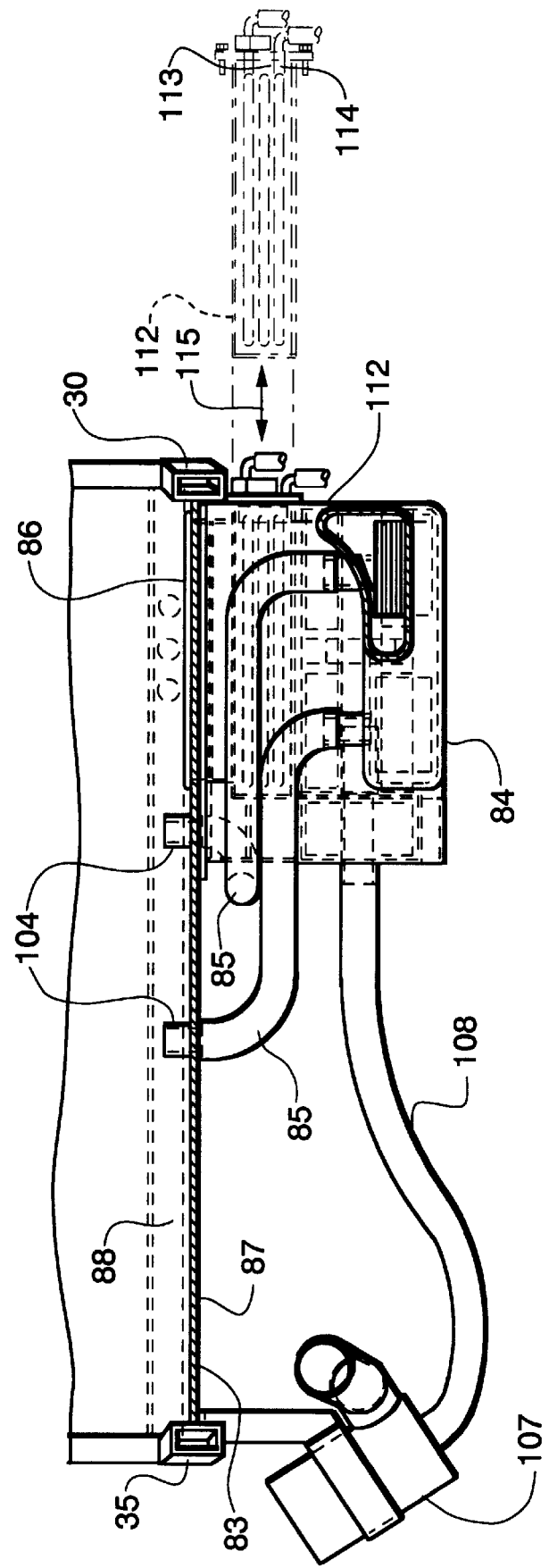
FIG. 5 is a horizontal sectional view taken on the line 5—5 of FIG. 3 showing the relationship of the HVAC unit to the cab structure.

During maintenance of the threshing system, the cab 10 may be removed by the removal of 4 bolts 109a, b, c and d, the unplugging of three wire harness plugs 110a, b and c and the removal of the core 112 of the HVAC unit 84 (FIG. 5). The core 112 contains an engine coolant line 113, typically containing ethylene glycol used for heat and a refrigerant line (containing a refrigerant) 114 used to cool the cab. Besides making removal of the cab less complex, the refrigerant and coolant fluids in the HVAC unit are not lost. It is also desirable to obtain access to the core 112 for routine cleaning. Again, the core 112 can be easily slid 115 to the right and cleaned without opening the refrigerant or coolant lines. Because of environmental regulations, saving the refrigerant in an HVAC unit represents considerable cost savings. Furthermore, the ability to easily clean the core 112 also enables easier and more frequent maintenance. The will extend the lifespan of the expensive HVAC unit as a whole.

It will be obvious to those skilled in the art that various changes may be made without departing from the scope of the invention and the invention is not to be considered limited to what is illustrated in the drawings and described in the specification.

What is claimed is:

1. A combine harvester cab, comprising:
   a. a lower panel having a right front post, a left front post, a right rear post and a left rear post, each said post perpendicularly affixed to the lower panel;
   b. an upper panel perpendicularly supported by the right front post, the left front post, the right rear post and the left rear post;
   c. a rear panel affixed to the lower panel, the left rear post, the right rear post and the upper panel, said rear panel having a deck;
   d. a front windshield generally parallel to the rear panel, said front windshield affixed to the lower panel, the upper panel, the right front post and left front post, said front windshield having a first compound curved glass surface;
   e. a left door pivotally affixed to the left front post, said left door having a second compound curved glass surface said second compound curved glass surface forming a periphery of said left door; and
   f. a right door generally parallel to the left door, said door pivotally affixed to the right front post, said right door having a third compound curved glass surface said third compound curved glass surface forming a periphery of said right door.

2. The combine harvester cab described in claim 1, wherein the deck has a first storage box and a second storage box.

3. A combine harvester cab, comprising:
   a. a lower panel having a right front post, a left front post, a right rear post and a left rear post, each said post generally perpendicularly affixed to the lower panel;
   b. an upper panel generally perpendicularly supported by the right front post, the left front post, the right rear post and the left rear post;
   c. a rear panel affixed to the lower panel, the left rear post, the right rear post and the upper panel, said rear panel having a deck;
   d. a front windshield generally parallel to the rear panel, said front windshield affixed to the lower panel, the upper panel, the right front post and left front post, said front windshield having a first compound curved glass surface;
   wherein the rear panel further comprises:
   e. a quadrilateral left door pivotally affixed to the left front post and said left door able to contact the lower panel, the upper panel and left rear post, said left door having a second compound curved glass surface, said second compound curved glass surface forming a periphery of said left door; and
   f. a quadrilateral right door generally parallel to the left door, said right door pivotally affixed to the right front post, said right door able to contact the lower panel, the upper panel and right rear post, said right door having a third compound curved glass surface, said third compound curved glass surface forming a periphery of said right door, whereby the second compound curved glass and third compound curved glass minimizes sound dispersion within the cab.

4. The combine harvester cab described in claim 3, wherein the rear panel further comprises an upper rear panel and a lower rear panel, said deck being horizontally positioned between the lower rear panel and upper rear panel.

5. The combine harvester cab described in claim 4, wherein a heating, ventilation and air conditioning unit is affixed on an exterior surface of the lower rear panel.

6. The combine harvester cab described in claim 5 wherein the left door is pivotally affixed to the left front post by a first left hinge and second left hinge, and right door is pivotally affixed to the right front post by a first right hinge and second right hinge.

7. The combine harvester cab described in claim 6, wherein the right front post and left front post have a smaller circumference relative to the right rear post and left rear post.

8. The combine harvester cab described in claim 7 wherein the operator's chair further comprises a driver's seat storage area having a drawer and a pull.

9. The combine harvester cab described in claim 8, wherein an air filter for a fresh air intake is affixed to the exterior of the lower rear panel.

10. In a cab of a combine harvester, said cab having a steering column, an operator's seat, a heating, ventilation and air conditioning unit with a refrigerant and a core, said unit having a fresh air intake connected to a fresh air filter, said fresh air filter connected to the unit, a plurality of distribution ducting connecting the unit to a vent, a return air filter connected to the unit, a lower panel having a right front post, a left front post, a right rear post and a left rear post, each said post generally perpendicularly affixed to the lower panel, an upper panel generally perpendicularly supported by the right front post, the left front post, the right rear post and the left rear post, a rear panel affixed to the lower panel, the left rear post, the right rear post and the upper panel, a front windshield generally parallel to the rear panel, said front windshield affixed to the lower panel, the upper panel, the right front post and left front post, said front windshield having a first compound curved glass surface, a left door pivotally affixed to the left front post, a right door generally parallel to the left door, said right door pivotally affixed to the right front post, the improvement comprising said rear panel further comprises an upper rear panel and a lower rear panel, a deck being horizontally positioned between the lower rear panel and upper rear panel, said deck having a first storage box and second storage box, wherein said left door having a second compound curved glass surface said second compound curved glass surface forming a periphery of said left door; said second compound glass surface being self supporting, the left door having an angled left door handle; and said right door having a third compound curved glass surface said third compound curved glass surface forming a periphery of said right door, said third compound curved glass surface being self supporting.

11. The improvement described in claim 10 wherein said right front post and left front post have a smaller circumference relative to the right rear post and left rear post.

12. The improvement described in claim 11 wherein the operator's chair further comprises a driver's seat storage area.

13. The improvement described in claim 12 wherein the cab is removed from the combine by removing four bolts, three wire harness plugs and removing the a core of the heating, ventilation and air conditioning unit, whereby allowing the cab to be easily removed.

14. The improvement described in claim 13, wherein the front left post and front right post have a circumference of 9.5 inches and the rear left post and rear right post have a circumference of 13.5 inches.

* * * * *